US006663329B2

(12) United States Patent
Singh et al.

(10) Patent No.: US 6,663,329 B2
(45) Date of Patent: Dec. 16, 2003

(54) SELF-PENETRATING FASTENING RIVET

(75) Inventors: Sumanjit Singh, Gaimersheim (DE);
Stuart Edmond Blacket, Queensland (AU); Trevor B. Jones, Bolton (GB); Howard J. Litherland, Clywd (GB)

(73) Assignee: Audi AG (DE)

( * ) Notice: Subject to any disclaimer, the term of this patent is extended or adjusted under 35 U.S.C. 154(b) by 129 days.

(21) Appl. No.: 09/950,971

(22) Filed: Sep. 13, 2001

(65) Prior Publication Data
US 2002/0006321 A1 Jan. 17, 2002

Related U.S. Application Data

(63) Continuation of application No. 08/619,672, filed as application No. PCT/EP94/03159 on Sep. 21, 1994, now Pat. No. 6,385,843.

(30) Foreign Application Priority Data

Sep. 29, 1993 (DE) ........................................ P 43 33 052

(51) Int. Cl.[7] ............................................... F16B 19/08
(52) U.S. Cl. ........................ 411/501; 29/432.2; 29/798
(58) Field of Search ............................. 29/432.1, 432.2, 29/798, 525.06, 243.53, 505; 411/501, 502, 503, 504, 181; 227/51, 58, 59

(56) References Cited

U.S. PATENT DOCUMENTS

| 4,802,803 A | * | 2/1989 | Muller ........................ 411/501 |
| 5,644,830 A | * | 7/1997 | Ladouceur et al. ......... 29/432.2 |
| 5,722,144 A | * | 3/1998 | Bora ........................ 29/525.06 |
| 5,752,305 A | * | 5/1998 | Cotterill et al. ............ 29/432.2 |
| 6,263,560 B1 | * | 7/2001 | Edwards ........................ 29/798 |
| 6,276,050 B1 | * | 8/2001 | Mauer et al. .................. 29/798 |
| 6,338,601 B1 | * | 1/2002 | Mauer et al. ............... 29/432.2 |
| 6,385,843 B1 | * | 5/2002 | Singh et al. ................... 29/798 |

FOREIGN PATENT DOCUMENTS

| GB | 2184510 | * | 6/1987 |
| ZA | 918340 | * | 7/1992 |

OTHER PUBLICATIONS

Kenneth Edwards, Pierce & Roll riveting– the alternative to spot welding, Aluminum Industry, Oct./Nov. 1992, vol. 11, No. 5, p. 24, Patrick Caird–Daley, Great Britain.

Specification for Semi–Tubular rivets for general purpose use, British Standards Institution, 1981, International Standards Organization, Great Britain.

Drawing T481011, Std Heads, The Bifurcated & Tubular Rivet Co. Ltd. Nov. 27, 1973, England.

Drawing AAA10386, 7/32 Nug ordinary, The Bifurcated & Tubular Rivet Co. Ltd. Dec. 18, 1973, England.

Drawing TSIA, Header Pins for Semi–Tubular Rivets, The Bifurcated & Tubular Rivet Co. Ltd. Dec. 14, 1966, England.

Drasing L11841, Semi–Tubular Rivet, Qualcast Ltd. Oct. 2, 1973 England.

* cited by examiner

Primary Examiner—David P. Bryant
(74) Attorney, Agent, or Firm—Stevens, Davis, Miller & Mosher, LLP

(57) ABSTRACT

A rivet capable of self-piercing at least one sheet of material and becoming embedded in one of such sheets, generally consisting of a head section and a shank section formed integrally with the head section, wherein the head section includes an upwardly and outwardly curved side wall surface extending from the shank section to an upper portion of the head section, and the shank section includes a recess in a lower end thereof, with the lower end of the shank section having a peripheral cutting edge sufficient to penetrate such material.

36 Claims, 1 Drawing Sheet

SELF-PENETRATING FASTENING RIVET

This is a continuation of U.S. patent application, Ser. No. 08/619,672, filed on Apr. 29, 1996, now U.S. Pat. No. 6,385,843, which is a 371 of PTC/EP94/03159 filed Sep. 21, 1994.

BACKGROUND OF THE INVENTION

The present invention relates to a self-penetrating fastening device consisting of a rivet adapted to be impacted by a punch and a counterpressure pad (die), and more particularly to a rivet consisting of a head and shank with a central cavity. The free end surface of the rivet (i.e. remote from the head) does not completely penetrate a workpiece receiving it.

A self-penetrating fastening system is described in German Patent DE 39 42 482 C1. In the embodiment described in this patent, two plates of different thicknesses, i.e., parts of the wall of a container, are connected to each other, with particular concern being given to water and gas tightness. Corrosion stability is also taken into account in this state of the art.

If such self-penetrating fastening systems are also to be used in the area of automotive technology, for example in order to connect body sheets together, other essential factors are involved in addition to corrosion stability. Because of the high mechanical stresses occurring, the strength of the connection of two plates is of critical importance. In addition, depending on the location where the connection is applied (i.e., uncovered body areas), it is desirable to make the top of the rivet head as nearly flush as possible with the surrounding plate surface after connection. The process of producing the riveted connection should damage the surface areas in question as little as possible (e.g., through deformation resulting from warping of the sheet), so as to hold to a minimum any finishing operations required to improve the appearance.

The state-of-the-art riveted connection does not meet these additional requirements to the extent desired.

SUMMARY OF THE INVENTION

It therefore is the principal object of the present invention to develop the state-of-the-art self-penetrating fastening system in such a manner that the riveted connection produced by the system will meet strict requirements with respect to its strength and so that the surface of the workpiece will be minimally affected.

As a result of the design of the shank cavity in the area of the free end surface, i.e., remote from the head, the cavity being substantially conical in this area, as the rivet penetrates a workpiece more deeply the resulting higher expansion force causes the radial movement of the rivet shank outward (affects expansion) to reach an order of magnitude such that an expansion angle>45° may be reached. This process results in an undercut that increases the strength, and the direct tensile strength in particular, since the end area of the rivet shank projects radially further than the convexity of the lower sheet adjoining the outside surface of the shank. The formation of the rivet shank in the area of the free end surface and the essentially rounded transition of the shank into the rivet head results in minimal deformation of the upper sheet during penetration. Further, if the rivet head has a flat top, the rounded transition enables this top to be embedded so as to be flush with the surrounding surface of the sheet and so that the circular notch marking the transition of rivet head to sheet surface is very narrow and extremely shallow.

In addition, the circumferential wall of the die cavity is designed so as to be radially movable. Especially in the case of thin sheets, this provides a supporting effect during cutting of the top sheet without inhibiting the spreading of the rivet shaft in the bottom plate since the spring-mounted groove blocks can move radially outward as required.

BRIEF DESCRIPTION OF THE DRAWINGS

Preferred embodiments of the invention are shown in the drawings and are explained in what follows with reference to appropriate parts of the drawings, in which.

DETAILED DESCRIPTION

Figure 1:
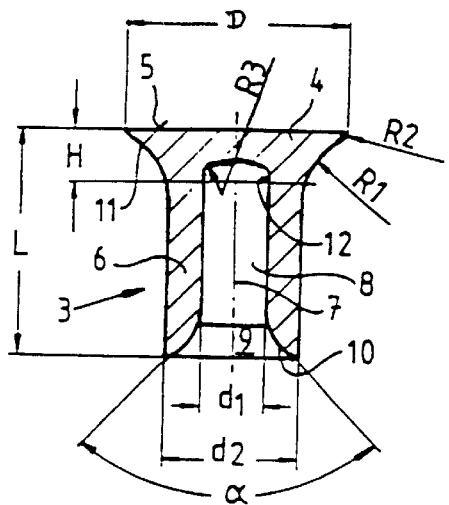
FIG. 1 is a vertical cross sectional view of a self-penetration fastening rivet embodying the present invention.

Referring to the drawing, a top and a bottom metal sheet 1 and 2 are joined together by means of a rivet 3. The rivet 3 consists of a rivet head 4 with flat top 5 and a cylindrical shank 6 with a central (longitudinal axis 7) cavity or recess 8.

In the area of the shank 6 remote from the rivet head 4, the cavity 8 is in the form of a cone or bevel 9 with aperture angle $\alpha$, the sides 10 of the cone preferably being slightly convex. As sharp an edge as possible is created within the limits of production technology so that upon impacting the rivet, it will penetrate the top metal sheet 1 by way of this edge and be embedded in the bottom metal sheet 2.

In addition to the cone aperture angle, $\alpha$, the shaping and dimensioning parameters of rivet 3 as shown in FIG. 1 are the diameter $d_1$ of the cavity 8, the diameter $d_2$ of the rivet shank 6, the diameter D of the rivet head 4, the total length L of the rivet 3, the height H of the rivet head 4, the outwardly directed radius R1 for the transition between rivet shank 6 and an upper portion of rivet head 4, the inwardly directed and adjoining radius R2 for the transition between, the outwardly directed radius R1 and rivet head top 5, and radius R3 for the bottom of cavity 8. The height H of the rivet head 4 is determined from the beginning of transition from rivet shank 6 to outwardly directed radius R1.

The depth of the cavity 8 is such that its rounded bottom 12 (radius R3) extends into the rivet head 4 as far as possible within the limits of production technology.

Radius R1 prevents the occurrence of high peak stresses in the rivet head area during the perforation process, inasmuch as there are no sharp edges present.

Figure 2:
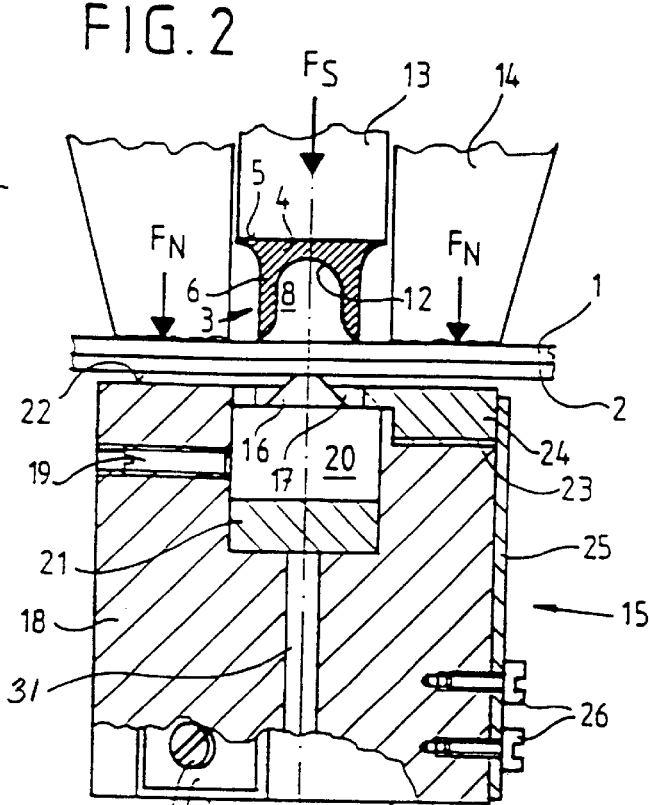
FIG. 2 is vertical cross sectional view of a system utilized to insert the rivet shown in FIG. 1 into a pair of metal sheets for securing such sheets together.
Figure 3:
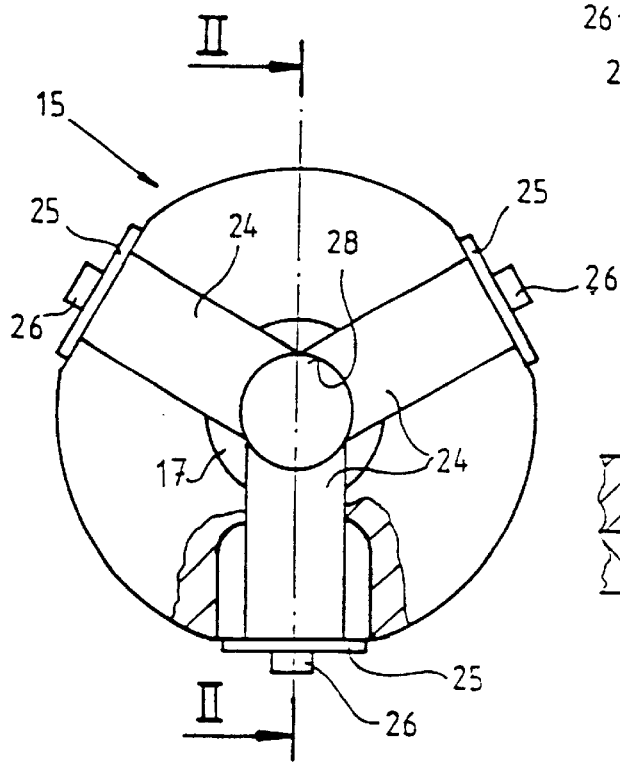
FIG. 3 a top view of a multipart die utilized in the system shown in FIG. 2.

The cone aperture angle $\alpha$ is to be selected preferably as a function of the properties of the material (yield point $R_{p0,2}$) of the metal sheets 1 and 2 to be joined. The following correspondences have been found to be advantageous:

$R_{p0,2} \geq 250$ N/mm$^2 \approx 75° < \alpha \sim 120°$ $R_{p0,2} < 250$ N/mm$^2 \approx 25° < \alpha < 75°$ FIGS. 2 and 3 illustrate a system for securing a pair of metal sheets 1 and 2 together by means of a rivet as shown in FIG. 1. The rivet 3 is impacted by a punching force $F_S$ applied by a punch 13 positioned on the top 5 of the rivet head 4. The punch 13 is surrounded by a pressure pad 14 which is in contact with the metal sheets 1 and 2 together with a die 15 functioning as a counterpressure tool having a pressure pad force $F_N$ applied to it. This pressure pad force $F_N$ should be kept constant during the rivet perforation process. This can be suitably accomplished by causing the pressure pad 14 to have a force applied to it by a suitable pressure-controlled hydraulic unit.

The surface of the pressure pad 14 engageable with the top metal sheet is roughened in order to optimize the action of this pad. As a result, excessive drawing of the surrounding sheet areas into the perforation zone during perforation can be prevented; instead, the top metal sheet 1 is cut cleanly.

The multipart die 15 illustrated in FIGS. 2 and 3 has a drift 20 with a punching stud 16. The drift 20 is received into a suitably dimensioned cavity 17 of a drift support 18 and held there by a setscrew 19 introduced into the cavity. The punching stud 16 can be caused to project a greater or lesser distance beyond the top 22 of the drift support 18 by a shim 21 of specific thickness, one which can easily be replaced by another shim of a different thickness. A vent 31 made in the drift support 18 extends to the cavity 17.

Three radially oriented grooves 23 evenly distributed over the circumference are made in the top 22 of the drift support 18, each groove receiving a block 24. The ends of the groove blocks 24 facing punching stud 16 are curved in shape and complement each other to form a closed circle.

The radially outer end of each groove block 24 has force applied to it by a leaf spring 25 which is fastened to the drift support 18 by pan head screws 26. Lastly, a pin 27 projecting downward from the drift support 18 serves to receive and secure it in a tool.

During the riveting process, the groove blocks 24 are forced outward by the material displaced by the rivet 3, that of the bottom metal sheet 2 in particular, so that an additional cavity promoting the spreading process is ultimately provided for the rivet 3. After the joint has been produced and the resulting bonded material removed from the die, the leaf springs 25 force the groove blocks back into their initial position.

It is essential for the diameter of the die (circle 28 formed by the groove blocks 24) to be at the beginning of the joining process only slightly larger than the outer diameter $d_2$ of the rivet shank 6, so that the perforation of the top of the metal sheet 1 facing the rivet will be as clean as possible without the metal sheet being drawn into the die 15.

Figure 4:
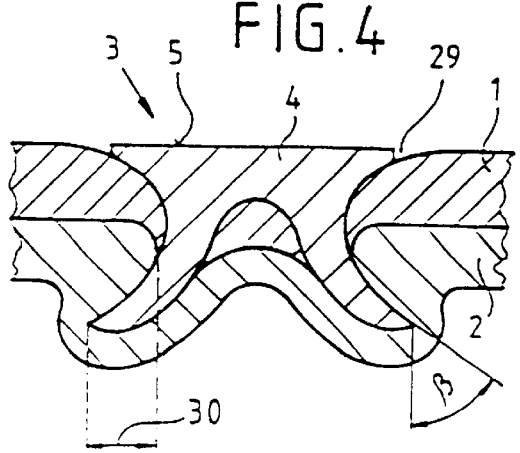
FIG. 4 cross-sectional view of a riveted joint made in the use of the system shown in FIGS. 2 and 3.

Lastly, FIG. 4 shows a finished riveted joint. It is made especially clear here that the top 5 of the rivet head 4 is flush with the top of the top metal sheet 1. It is also to be seen that the circular indentation 29 in the transitional area between rivet head 4 and top metal sheet 1 is quite small and shallow. FIG. 4 also shows the large undercut 30 greatly enhancing the strength of the riveted joint. This undercut 30 results among other things from the large rivet shank expansion angle $\beta$ (>45° if necessary) formed with the rivet 3 during perforation.

The self-penetrating fastening device may, of course, also be used to join more than two sheets, or even to fasten only one rivet, for instance one with a bolt head, in a single sheet.

Nor is application restricted to the joining of metal plates or metal sections. On the contrary, nonmetallic workpieces (e.g., ones of plastic) may also be joined by means of this device.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A rivet capable of self-piercing a first sheet of material overlying a second sheet of material and becoming embedded in said second sheet comprising:

a head section; and a shank section formed integrally with said head section;

wherein said head section includes an upwardly and outwardly curved side wall surface extending from said shank section to an upper portion of said head section, and said shank section includes a recess in a lower end thereof, said lower end of said shank section having a peripheral cutting edge sufficient to penetrate said first sheet of material.

2. A rivet according to claim 1 wherein said head section includes an upwardly and inwardly curved side wall surface extending from said first mentioned side wall surface to an upper end of said head section.

3. A rivet according to claim 2 wherein said head section is provided with uninterrupted planar end surface.

4. A rivet according to claim 2 wherein said shank section is provided with a cylindrical exterior surface.

5. A rivet according to claim 4 wherein said head section is provided with an uninterrupted planar surface disposed perpendicularly relative to the axis of said cylinder surface.

6. A rivet according to claim 2 wherein said recess extends into said head section.

7. A rivet according to claim 2 wherein said recess includes a cylindrical surface portion.

8. A rivet according to claim 2 wherein said recess includes a curved bottom surface.

9. A rivet according to claim 2 wherein the depth of said recess is less than a thickness of said sheet of material.

10. A rivet according to claim 2 wherein said rivet is capable of self-piercing at least two sheets of material and the depth of said recess is greater than a first of said sheets penetrated by said rivet.

11. A rivet according to claim 2 wherein said recess includes a conical surface.

12. A rivet according to claim 11 wherein an included angle of said conical surface is within the range of 25° and 120°.

13. A rivet according to claim 11 wherein said conical surface is slightly convex.

14. A rivet according to claim 2 wherein said shank section includes a cylindrical exterior surface and said recess includes a conical surface cooperating with said cylindrical surface to provide a circular cutting edge.

15. A rivet according to claim 2 wherein an outer end of said recess is provided with a beveled surface.

16. A rivet according to claim 15 wherein said beveled surface is annular.

17. A rivet according to claim 15 wherein said beveled surface is slightly convex.

18. A rivet according to claim 2 wherein said rivet is formed of a material harder than the material of said sheet.

19. A rivet according to claim 1 wherein said head section is provided with uninterrupted planar end surface.

20. A rivet according to claim 2 wherein said shank section is provided with a cylindrical exterior surface.

21. A rivet according to claim 20 wherein said head section is provided with an uninterrupted planar surface disposed perpendicularly relative to the axis of said cylindrical surface.

22. A rivet according to claim 1 wherein said recess extends into said head section.

23. A rivet according to claim 1 wherein said recess includes a cylindrical surface portion.

24. A rivet according to claim 1 wherein said recess includes a curved bottom surface.

25. A rivet according to claim 1 wherein the depth of said recess is less than a thickness of said sheets of material.

26. A rivet according to claim 1 wherein said rivet is capable of self-piercing at least two sheets of material and the depth of said recess is greater than a first of said sheets penetrated by said rivet.

27. A rivet according to claim 1 wherein said recess includes a conical surface.

28. A rivet according to claim 27 wherein an included angle of said conical surface is within the range of 25° and 120°.

29. A rivet according to claim 27 wherein said conical surface is slightly convex.

30. A rivet according to 1 wherein said shank section includes a cylindrical exterior surface and said recess includes a conical surface cooperating with said cylindrical surface to provide a circular cutting edge.

31. A rivet according to claim 1 wherein an outer end of said recess is provided with a beveled surface.

32. A rivet according claim 31 wherein said beveled surface is annular.

33. A rivet according to claim 31 wherein said beveled surface is slightly convex.

34. A rivet according to claim 1 wherein said rivet is formed of a material harder than the material of said first sheet.

35. A rivet according to claim 1 wherein said rivet and said first sheet are formed of metals.

36. A rivet according to claim 1 wherein said rivet and said first sheet are formed of plastic materials.

* * * * *